United States Patent Office 3,351,123
Patented Nov. 7, 1967

3,351,123
MOLD AND PROCESS OF COATING FOAMED PATTERN WITH REFRACTORY FILLER AND SILICON-CONTAINING BINDER
John Payne, Pink Lane, Burnham, England, assignor to Monsanto Chemicals Limited, London, England, a British company
No Drawing. Filed Oct. 9, 1964, Ser. No. 402,948
Claims priority, application Great Britain, Oct. 23, 1963, 42,248/63
10 Claims. (Cl. 164—34)

This invention relates to the casting of metals, and particularly to a mold and a new process by which a metal is cast in the mold having a destructible pattern.

In the casting of metals using a refractory mold, it has been proposed to use a destructible pattern made of a material that vaporizes on contact with molten metal when poured into the mold. This process works well in principle, but it has been found capable of improvement in certain respects, for instance the surface finish to the casting is not always as good as is desirable. There has however now been found an improved process by means of which castings having a high degree of surface finish can be produced.

This invention is directed to a mold having a destructible pattern and to a process for casting metal into the mold. The mold of this invention comprises a foamed thermoplastic synthetic resin pattern having coated on the outside thereof a refractory coating consisting of a particulate refractory filler bonded together with a silicon-containing binding agent. The process of the invention is one for casting a metal in the mold, which process comprises coating a foamed thermoplastic synthetic resin pattern with a refractory coating comprising a mixture of a silicon-containing binding agent and a particulate refractory filler. The coating is allowed to set or harden to provide a refractory coating. The refractory coated foamed thermoplastic pattern is supported with a backup of sand or some other suitable material so as to produce a mold. Molten metal is then poured onto the pattern, volatilizing the pattern and filling the mold.

The foamed thermoplastic synthetic resins which can be employed in the practice of this invention include cellulose ethers and esters, e.g., ethyl cellulose, cellulose acetate, cellulose nitrate, cellulose butyrate; homopolymers and interpolymers of monomeric compounds containing the vinylidene grouping $CH_2=C<$ such as vinyl halides, e.g., vinyl chloride, vinyl bromide; vinylidene chloride; olefins, e.g., ethylene, propylene, isobutylene; vinyl esters of carboxylic acids, e.g., vinyl acetate, vinyl propionate, vinyl benzoate; vinyl ethers, e.g., vinyl methyl ether, vinyl isobutyl ether; unsaturated carboxylic acids and derivatives thereof, e.g., acrylic acid, methacrylic acid, acrylic acid and methacrylic acid esters of alcohols containing 1–18 carbon atoms such as methyl and ethyl methacrylate, acrylamide, methacrylamide, methacrylonitrile, acrylonitrile; vinyl aromatic compounds, e.g., styrene, alpha-methylstyrene, vinyl toluenes, p-ethylstyrene, 2,4-dimethylstyrene, o-chlorostyrene, 2,5-dichlorostyrene, vinyl napthalene; and interpolymers of vinylidene monomers of the above type with alpha, beta-unsaturated polycarboxylic acids and derivatives thereof, e.g., maleic anhydride, diethyl maleate, dibutyl fumarate, etc. It may be feasible and desirable to employ blends of two or more thermoplastic synthetic resins such as blends of styrene polymers with rubber diene polymers such as natural rubber, butadiene-styrene interpolymers, butadiene - acrylonitrile interpolymers and the like. Styrene graft copolymers prepared by polymerizing monomeric styrene, either alone or in admixture with other vinylidene monomers such as acrylonitrile, in the presence of a rubbery diene polymer may also be employed advantageously. The preferred thermoplastic synthetic resins to be employed in the practice of this invention are styrene homopolymers and styrene interpolymers containing at least 50% by weight of styrene and up to 50% by weight of a vinylidene monomer interpolymerizable therewith, e.g., butadiene, acrylonitrile, alpha-methylstyrene and the like.

The foamed thermoplastic synthetic resin used in this process is foamed by means of a blowing agent or foaming agent which is preferably a volatile foaming agent having a boiling point of less than 100° C. In some cases the blowing agent may be one that is normally gaseous at atmospheric pressure but which while under pressure before extrusion is present in the liquid state. Examples of a volatile foaming agent that can be used include lower aliphatic hydrocarbons such as ethane, propane, butane or pentane, lower alkyl halides such as methyl chloride, trichloromethane or 1,2-dichlorotetrafluoroethane, and inorganic gases such as carbon dioxide or nitrogen. The lower aliphatic hydrocarbons, especially butane, are preferred. The blowing agent can also be a chemical blowing agent, which can for example be a bicarbonate such as for example sodium bicarbonate or ammonium bicarbonate, or an organic nitrogen compound that yields nitrogen on heating, such as for example dinitrosopentamethylenediamine or barium azodicarboxylate.

The pattern can be made in the desired shape either by sawing, drilling, routing or otherwise shaping a block of the foamed resin or by molding in the desired shape. For example, when molding, foamable polystyrene beads containing a volatile foaming agent are first expanded by the action of heat and then further expanded and consolidated in a mold so that a shape foamed polystyrene article is produced. The last method is particularly suitable where a number of similar metal articles are to be produced. As used herein, pattern means a model for making the mold into which molten metal is poured to form a casting.

The preferred silicon-containing binding agent is one formed by hydrolysis of a silicate ester, which in practice is a condensed silicate, that is to say a mixture of polysilicates. Good results are obtained using an ethyl silicate or an isopropyl silicate. In use, the silicate is hydrolyzed with up to 15% by weight of water, preferably in the presence of an acid catalyst, for instance hydrochloric acid, and a mutual solvent, for instance ethyl or isopropyl alcohol.

The binding agent can also be an aqueous silica sol, which can suitably be one containing perhaps 15% to 50% of silica by weight. Good results are obtained when the concentration of silica in the sol is within the range of from 20% to 40% by weight, particularly when the concentration is about 30% by weight. The silica sols containing about 30% by weight of silica are especially useful.

Any of the refractory materials are suitable in the practice of this invention. However, particularly useful are such refractory fillers as aluminosilicates, such as molochite, sillimanite or mullite; silicon carbide; oxides, such as silica, alumina, magnesia or zirconia; silicates, such as zircon or forsterite; and various calcined fireclays.

Generally fine particle size fillers are employed but preferably the particle size of the filler is less than 200 mesh, in that none of the powder is retained on a 200 mesh British Standard Sieve (B.S.S.), and preferably the filler should contain a significant proportion, perhaps 50 to 75%, of material having a particle size less than 300 mesh. The refractory coating mixture can be prepared simply by mixing the powdered filler a little at a time with the binder until the mixture has a viscosity in the range of preferably about 50 to 2000 centipoises. A suitable mixture can for example contain between about 30 and about 90 parts of the binder per 100 parts by weight of the filler, depending mainly on the type and state of subdivision of the filler.

The foamed thermoplastic synthetic resin pattern can be coated with the refractory mixture by dipping it in a bath of the mixture and allowing the excess to drain off, or spraying the mixture on to the pattern. The coating can for example be from 0.008 to 0.10 inch thick, and preferably from 0.01 to 0.05 inch thick.

After the pattern has been coated with the refractory mixture, the coating is allowed to harden, and this can if desired be done simply by drying the coating in the atmosphere. Another, quicker, method is to cause the silicon-containing binding agent in the mixture to gel by the action of a gelation accelerator. In the instance of a hydrolyzed silicate ester binder the accelerator can for example be ammonia, or an organic amine such as for instance pyridine, piperidine or dicyclohexylamine. When the binder is a silica sol the accelerator can be for example calcium carbonate, calcium chloride, sodium carbonate, magnesium oxide, magnesium carbonate, ammonium chloride, hydrochloric acid or sulphuric acid. After the first coating has been applied and hardened further coatings can if desired be added but this is not usually necessary. If further coatings are added the thickness of the completed coating of course can vary in excess of 0.10 inch thick.

The refractory coated foamed thermoplastic synthetic resin pattern should preferably be supported by a suitable material, especially for instance a sand such as for example foundry sand. Clay, plaster of Paris or lead shot can also be used for this purpose. The molten metal is then poured on to the pattern, causing it to volatilize and filling the mold as it does so. Vents can if desired be left in the coating and the supporting material in order to assist in removal of the volatilization products. The means of supporting the mold during the casting of metal is generally well-known in the foundry trade and in particular in foundries employing the shell mold technique of casting.

When the metal has cooled sufficiently, the refractory coating and its support are removed from the casting, which is usually ready for use with little if any further treatment being necessary.

The process of the invention is especially applicable to the casting of ferrous metals such as for example cast iron or steel, but can be used to produce castings of non-ferrous metals, for instance light alloys based on aluminum or magnesium. Small or large castings, weighing from a few pounds to many tons can be produced.

The process of the invention is illustrated by the following examples.

EXAMPLE 1

This example describes a process according to the invention for the production of an iron casting using a foamed polystyrene pattern coated with a refractory coating comprising a partially hydrolyzed ethyl silicate as binding agent.

A partially hydrolyzed solution of ethyl silicate was first prepared as follows:

600 cc. of ethyl silicate containing the equivalent of about 40 to 42% by weight of silica are poured slowly with stirring into a mixture of 360 cc. of methanol, 40 cc. of water and 1.0 cc. of concentrated hydrochloric acid (specific gravity 1.16). The quantity of water present is about 10% by weight of the ethyl silicate. Stirring was continued for a further 20 minutes and the solution was then allowed to stand for 16 hours.

2000 cc. of sillimanite having a particle size less than 200 B.S.S. mesh is added gradually with continuous stirring to the hydrolyzed solution of ethyl silicate to form a coating mixture or slurry.

A shaped pattern of foamed polystyrene having a density of 1 pound per cubic foot was sprayed with the slurry so that an even coating of about 0.02 inch thick is formed over the surface with the exception of one end. The coating is hardened by exposure to an atmosphere containing ammonia gas for 30 seconds.

The coated pattern is then placed upright in a box of foundry sand in order to support the coating, and molten cast iron is poured on to the uncoated end of the pattern. The foamed polystyrene collapses and decomposes by the heat of the molten iron, and as the pattern becomes progressively volatilized it is replaced by the iron until the latter completely fills the mold.

When the iron has cooled sufficiently, the sand and the coating are removed. The casting has excellent surface finish and requires little or no additional finishing.

For the purpose of comparison the above procedure is repeated except that the treatment of the pattern with the slurry is omitted and the said is applied directly to the pattern surface. The surface finish of the resulting casting is greatly inferior to that of the first.

EXAMPLE 2

This example describes a process according to the invention for the production of an iron casting using a foamed polystyrene pattern coated with a refractory coating comprising a silica sol as binding agent.

The procedure described in Example 1 is repeated, but using a slurry prepared from 150 grams of sillimanite having a particle size less than 200 B.S.S. mesh and 90 grams of a stable silica sol containing 30% by weight of silica colloidally dispersed in water to which has been added sufficient concentrated hydrochloric acid to give an approximately 0.1 N solution (about 1.5 cc.)

The final casting obtained is again of very good surface finish.

What is claimed is:

1. A mold for use in casting metal which comprises a foamed thermoplastic synthetic resin pattern having coated on the outside thereof a temperature resistant, form-retaining refractory coating consisting of a single admixture of a particulate refractory filler bonded together with a silicon-containing binding agent.

2. The mold of claim 1 wherein the foamed thermoplastic synthetic resin pattern is foamed styrene homopolymer.

3. The mold of claim 1 wherein the silicon-containing binding agent is a silicate ester.

4. The mold of claim 3 wherein the silicate ester is ethyl silicate.

5. The mold of claim 1 wherein the silicon-containing binding agent is silica sol.

6. The mold of claim 1 wherein the particulate refractory filler is selected from the group consisting of silicon carbide and the oxides of aluminum, silicon, magnesium and zirconium and mixtures thereof.

7. A process for casting a metal in a mold which process comprises coating a foamed thermoplastic synthetic resin pattern with a refractory coating which coating comprises a single mixture of a particulate refractory filler and a silicon-containing binding agent, hardening the refractory coating to a temperature resistant, form-retaining shape, embedding said coated pattern in a support material and pouring molten metal on to the foamed thermoplastic synthetic resin pattern so as to volatilize the pattern and fill the mold.

8. The process of claim 7 wherein the foamed thermoplastic synthetic resin pattern is foamed styrene homopolymer.

9. The process of claim 7 wherein the silicon-containing binding agent is a hydrolyzed silicate ester.

10. The process of claim 7 wherein the silicon-containing binding agent is aqueous silica sol.

References Cited

UNITED STATES PATENTS

| 3,270,382 | 9/1966 | Emblem et al. | 164—26 |
| 2,701,902 | 2/1955 | Strachan | 164—20 |
| 2,829,060 | 4/1958 | Garton et al. | 164—16 X |
| 3,010,852 | 11/1961 | Prange et al. | 164—35 X |
| 3,148,422 | 9/1964 | Payne | 164—26 |
| 3,169,288 | 2/1965 | Dewey | 164—34 |

J. SPENCER OVERHOLSER, *Primary Examiner.*

R. D. BALDWIN, *Assistant Examiner.*